Aug. 17, 1926.
W. E. FULLER
ASH REMOVER
Filed Jan. 15, 1926    2 Sheets-Sheet 1
1,596,824
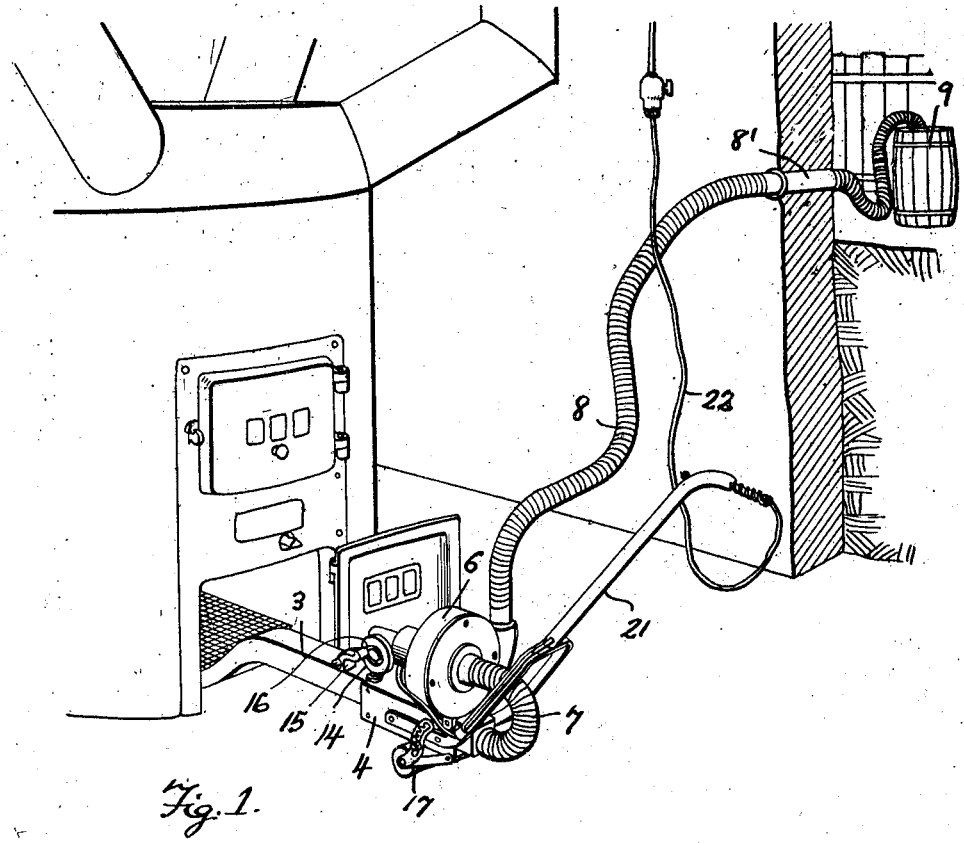
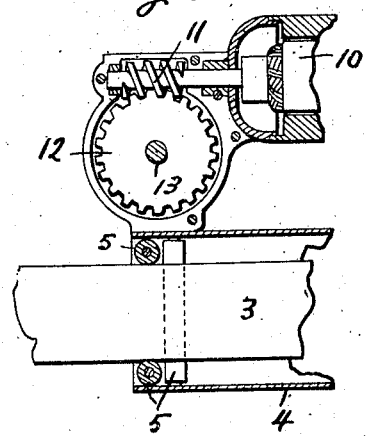
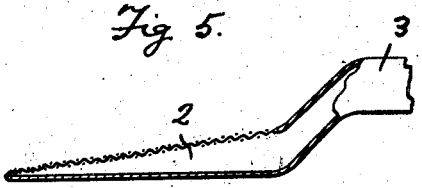
Walter E. Fuller
INVENTOR
BY Victor J. Evans
ATTORNEY
WITNESS: Gerald Hennesy Aug. 17, 1926.

W. E. FULLER 1,596,824

ASH REMOVER

Filed Jan. 15, 1926   2 Sheets-Sheet 2

Walter E. Fuller
INVENTOR

BY Victor J. Evans
ATTORNEY

WITNESS: Gerald Hennesy

Patented Aug. 17, 1926.

1,596,824

UNITED STATES PATENT OFFICE.

WALTER E. FULLER, OF ROANOKE, VIRGINIA.

ASH REMOVER.

Application filed January 15, 1926. Serial No. 81,596.

This invention relates to means for sifting ashes in a stove or furnace and removing the ashes by means of a fan device and depositing them in an ash can or other receptacle located outside of the cellar or furnace room, the general object of the invention being to provide a hollow shovel having a screen thereon which acts as a sifter, with a blower attached to the hollow stem of the shovel for drawing the ashes through the same, with means associated with the blower for reciprocating the shovel and a conveyor tube connected with the discharge of the blower for conveying the ashes to a receptacle.

A further object of the invention is to provide means for adjusting the height of the device to make it suit different kinds of furnaces and stoves.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Figure 1 is a view showing the invention in use.

Figure 4 is a sectional view showing the means for reciprocating the shovel.

Figure 5 is a sectional view through the sifter part of the shovel.

Figure 2:
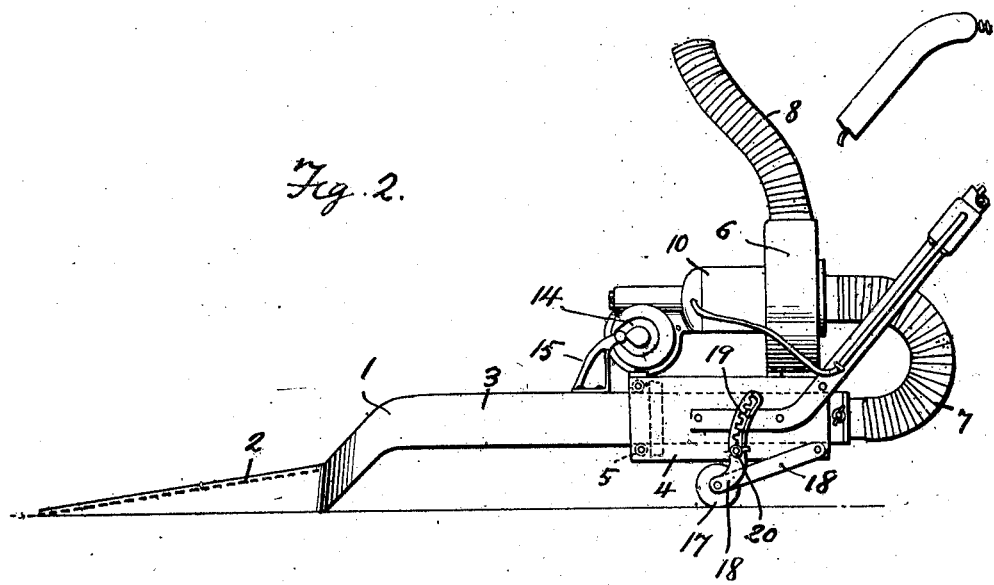
Figure 2 is a side view of the device.
Figure 3:
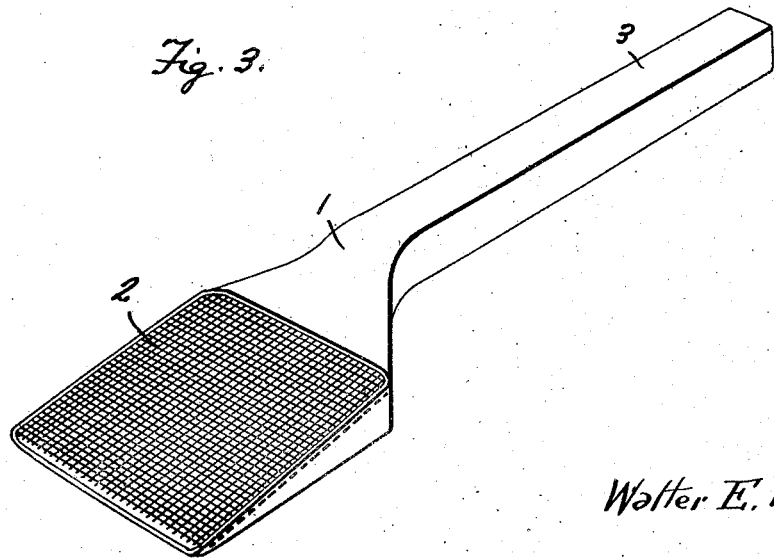
Figure 3 is a perspective view of the shovel.

In these views, 1 indicates a hollow shovel-shaped member which has a screen 2 placed over its head to make this head a sifter. The handle 3 of the shovel is hollow and is of square shape in cross section. The handle passes through a casing 4 which is provided with the rollers 5 so that the handle is movably supported in the casing. A fan or blower 6 is mounted on the casing and the inlet end of the fan is connected by the flexible pipe 7 with the end of the handle, so that when the fan is in operation, a suction will be created in the shovel to draw ashes from the head through the handle into the fan where they are discharged through the flexible pipe 8 into an ash can 9 or the like, which is preferably located outside of the building, the pipe 8 having a portion 8' passing through a hole or window in the cellar wall. The motor 10 of the fan has a worm 11 on the rear extension of the shaft and this worm meshes with a gear 12 on a shaft 13 rotatably supported on the top of the casing 4 and to which a cam wheel 14 is connected. A bracket 15 is attached to the handle of the shovel and carries a roller 16 which engages the cam groove so that the shovel will be reciprocated by the motor when the same is in operation. The casing 4 is supported by the rollers 17 which are adjustably supported on the casing through means of the links 18, one of which having the slot 19 having notches in one wall thereof for receiving the adjusting bolt 20 carried by the casing. This arrangement permits the rollers to be adjusted in relation to the casing to space the casing more or less from the floor so that the device can be adjusted to suit furnaces or stoves of different sizes. A handle 21 is connected with the casing for enabling the same to be moved to place its shovel in the ash pit of the stove or furnace or to remove it therefrom. The motor can be supplied with current from one of the light fixtures or the like through means of the conductors 22 which may pass through the handle 21.

From the foregoing, it will be seen that when ashes are to be removed from the ash pit, it is simply necessary to move the device to a position where the shovel will enter the pit and then by starting the motor up, the shovel will be given a reciprocatory movement which will shake the ashes on the screen so that the ashes will be separated from the cinders and the ashes falling through the screen will be drawn through the shovel into the blower and discharged into the can 9 through the pipe 8. The shovel is reciprocated at the same time through means of the cam which is driven by the motor of the blower.

With this invention, one can easily and quickly remove ashes and save the cinders and unburnt coal; with but little effort and with the creation of but little dust.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:—

1. A combined sifter and ash remover, comprising a hollow shovel, a screen over the head thereof, a blower connected with the handle of the shovel for creating a suction therein, a delivery pipe connected with the exhaust of the blower and means for reciprocating the shovel from the motor of the blower.

2. A combined sifter and ash remover comprising a casing having rollers therein, a hollow shovel having its handle supported by the roller a screen over the head of the shovel, a blower supported by the casing and having its inlet connected with the handle, a discharge tube connected with the outlet of the blower and means for reciprocating the shovel from the motor of the blower.

3. A combined sifter and ash remover, comprising a casing having rollers therein, a hollow shovel having its handle supported by the roller, a screen over the head of the shovel, a blower supported by the casing and having its inlet connected with the handle, a discharge tube connected with the outlet of the blower, a cam driven from the motor of the blower and a projection on the shovel handle engaging the cam.

4. A combined sifter and ash remover, comprising a casing having rollers therein, a hollow shovel having its handle supported by the roller, a screen over the head of the shovel, a blower supported by the casing and having its inlet connected with the handle, a discharge tube connected with the outlet of the blower, a cam driven from the motor of the blower, a projection on the shovel handle engaging the cam and means for adjusting the casing in relation to the floor.

5. A combined sifter and ash remover, comprising a casing having rollers therein, a hollow shovel having its handle supported by the roller, a screen over the head of the shovel, a blower supported by the casing and having its inlet connected with the handle, a discharge tube connected with the outlet of the blower, a cam driven from the motor of the blower, a projection on the shovel handle engaging the cam, a roller for supporting the casing, means for adjusting the roller relative to the casing and a handle connected with the casing.

In testimony whereof I affix my signature.

WALTER E. FULLER.